Oct. 24, 1967    J. F. MEACHAM    3,349,292
LOAD CENTER
Filed June 1, 1966    7 Sheets-Sheet 1

INVENTOR.
JAMES F. MEACHAM
BY
OSTROLENK, FABER, GERB & SOFFEN
ATTORNEYS

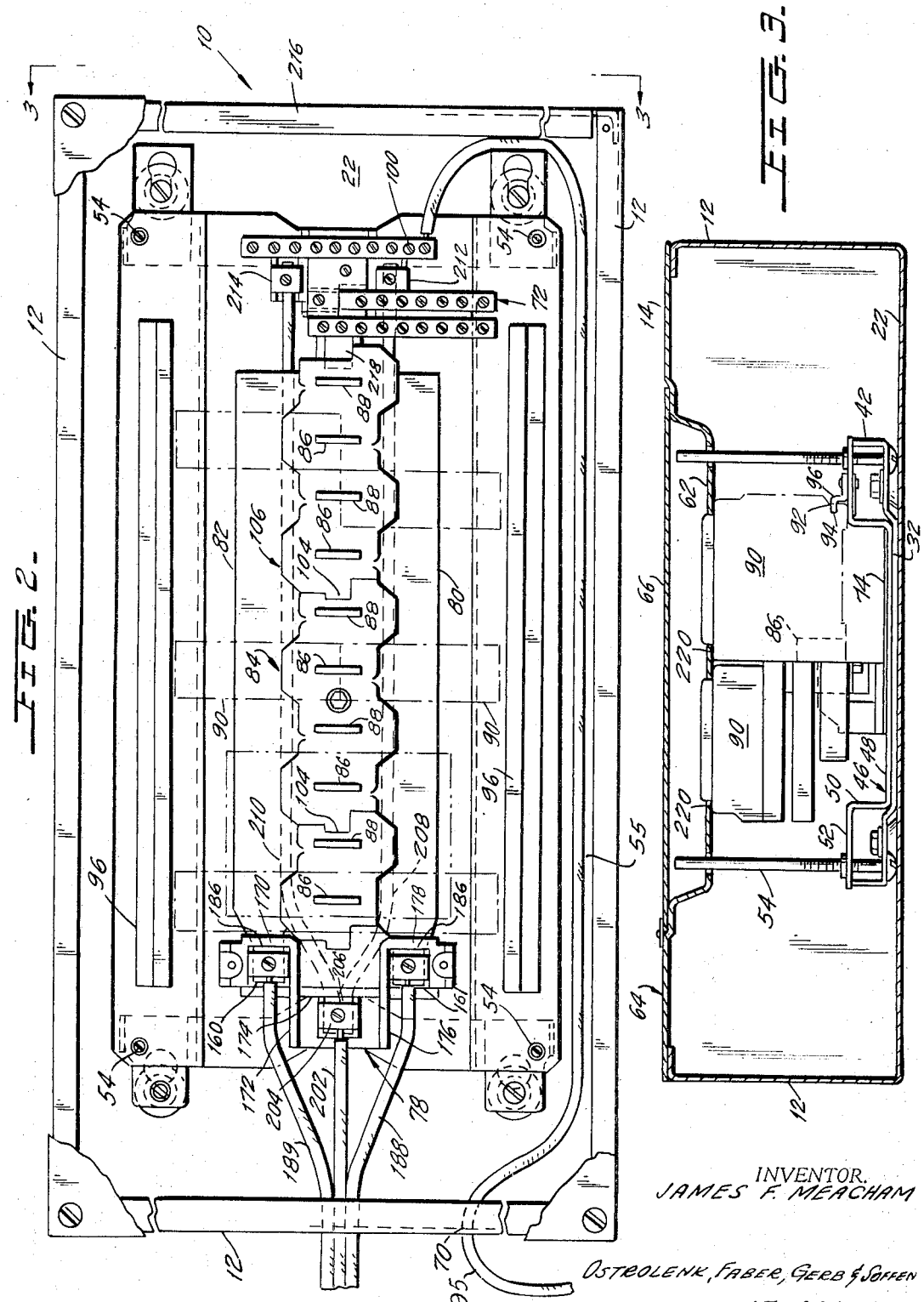

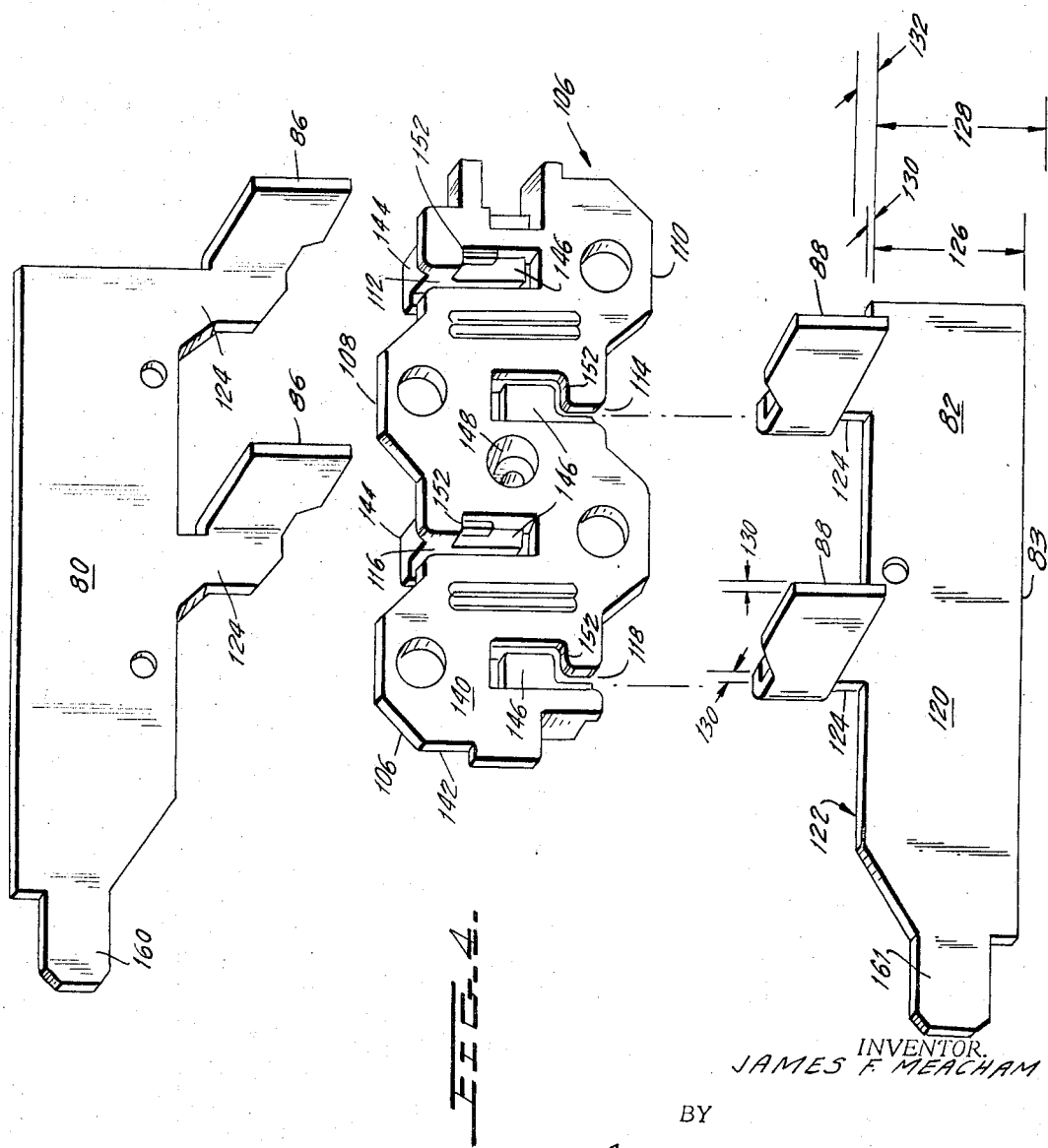

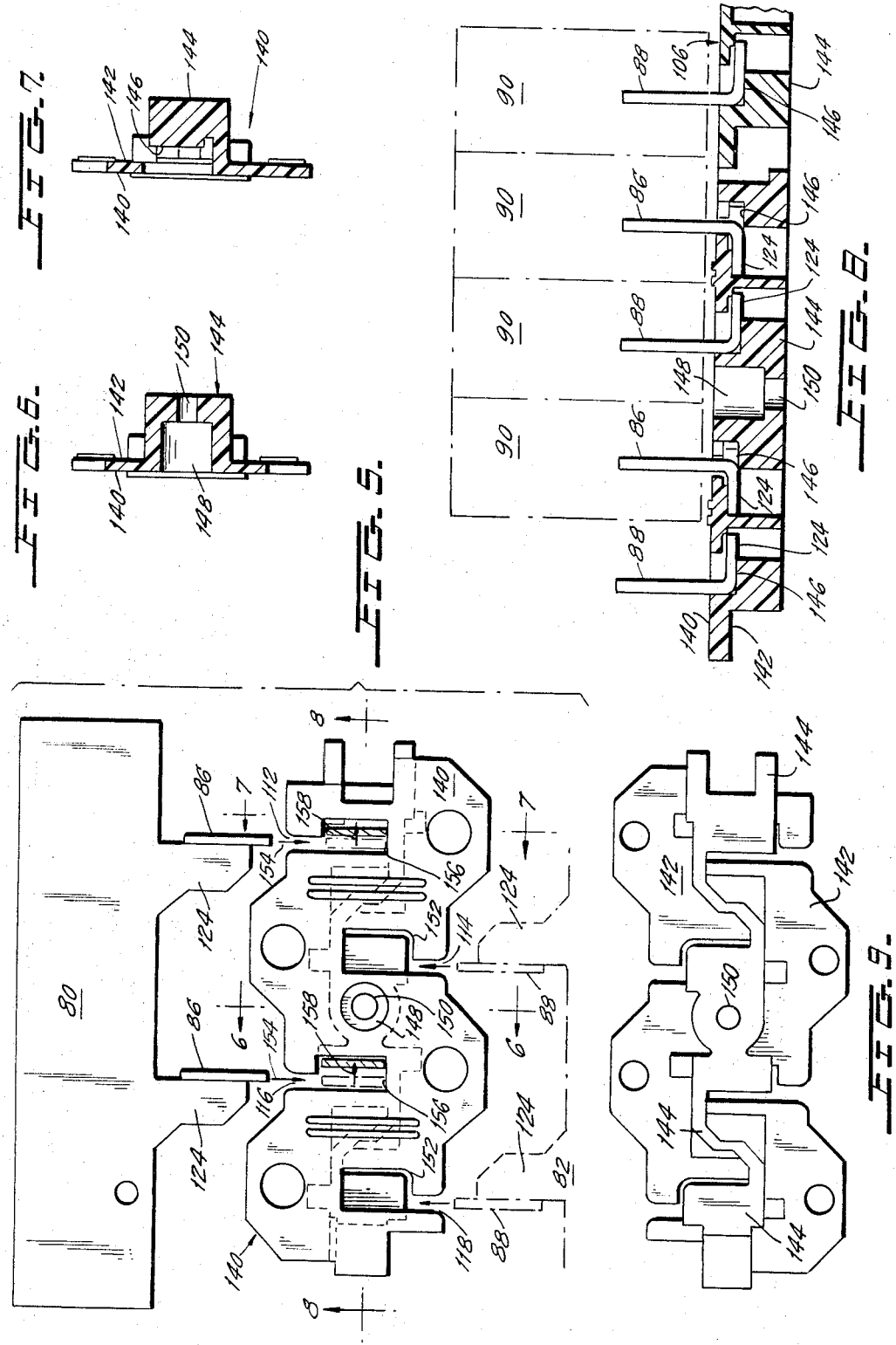

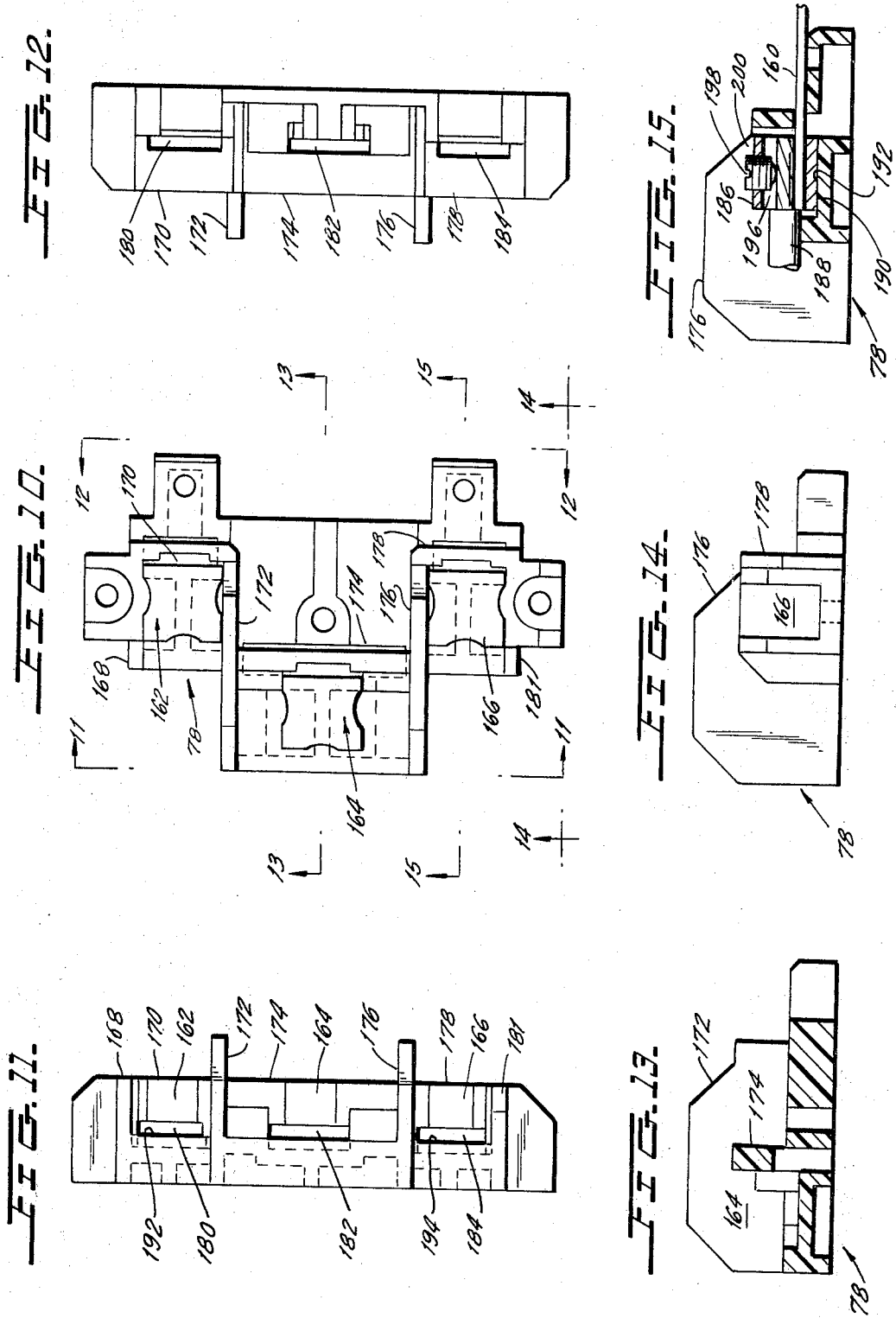

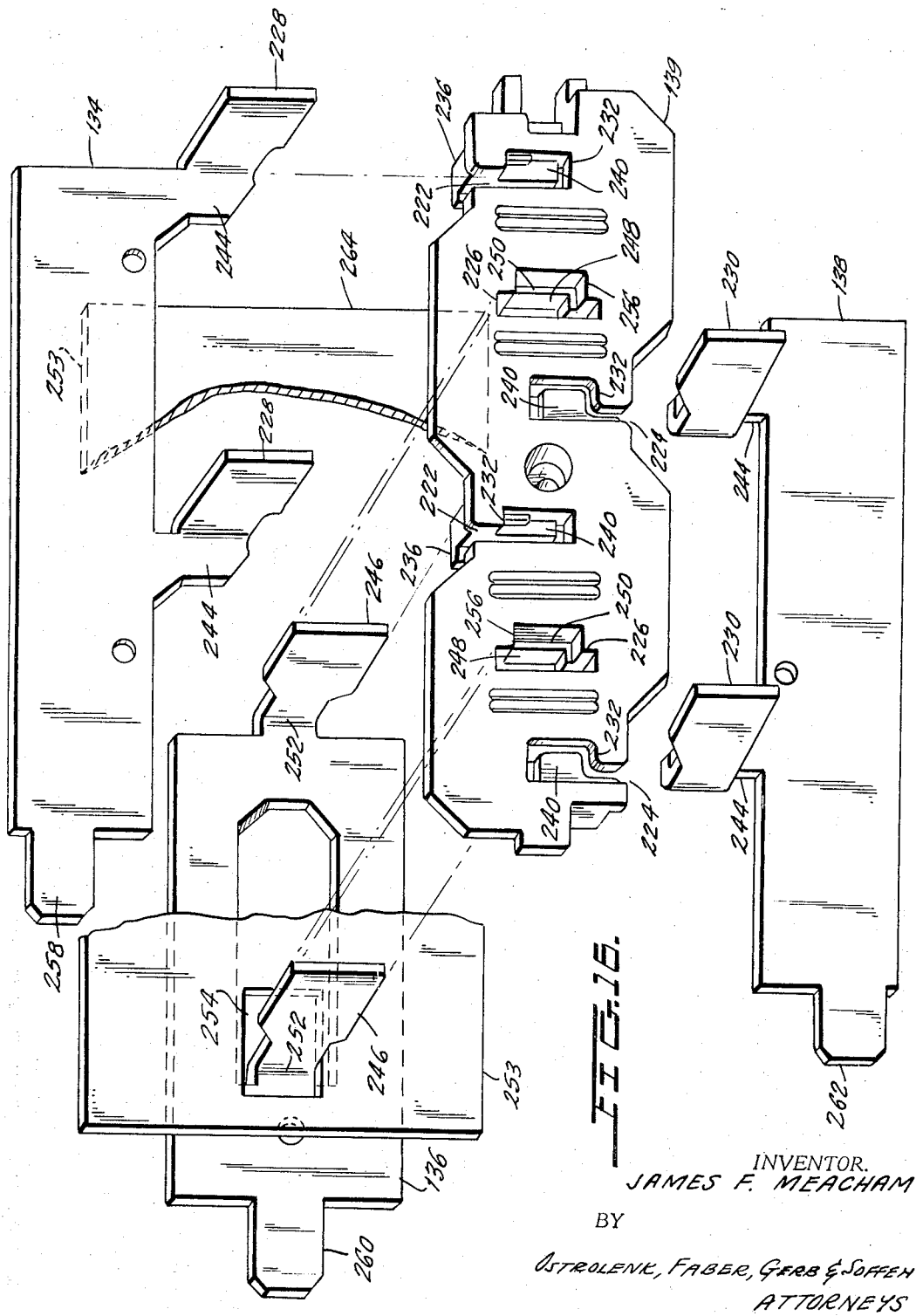

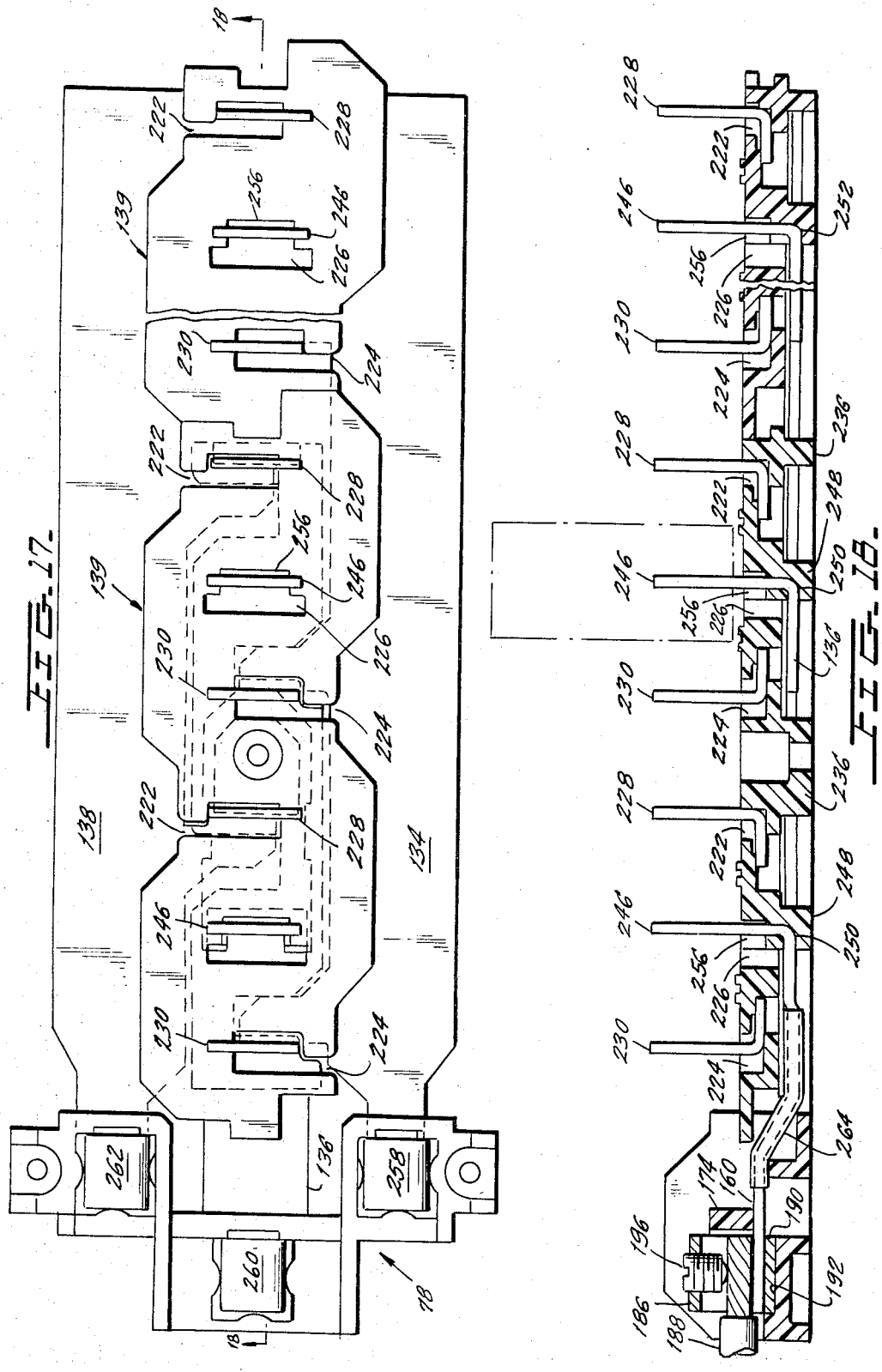

United States Patent Office 3,349,292
Patented Oct. 24, 1967

3,349,292
LOAD CENTER
James F. Meacham, Atlanta, Ga., assignor to I-T-E Circuit Breaker Company, Philadelphia, Pa., a corporation of Pennsylvania
Filed June 1, 1966, Ser. No. 554,430
25 Claims. (Cl. 317—120)

ABSTRACT OF THE DISCLOSURE

A load center for use in both one-phase and three-phase installations which incluudes a busbar mounting arrangement which compactly spaces, maintains, supports, insulates and locks all the busbars in place with respect to each other and with respect to the busbar molding without additional securing means; which includes a lug support molding by which the various busbars utilized may be electrically and mechanically connected to their respecitve incoming cables without the need for securing means fastening the terminal lugs associated therewith to the various busbars; and which further utilizes a plurality of adjusting screws positioned along the perimeter thereof to guide various cables along the outside edges or gutters of the load center to their ultimate connection to the neutral terminal assembly thereof in such a manner as to prohibit such cables from interfering with the busbar arrangements disposed centrally of the load center.

---

This invention relates to distribution systems, and more particularly to load centers having a plurality of distinct improvements which when integrated in a single load center improve operating characteristics while at the same time minimizing space requirements and decreasing overall costs.

Load centers are utilized as distribution points in electrical circuits to distribute the high current available at the main circuit to many branch circuits. Means individual to each branch circuit, in the form of a fuse or circuit breaker, is provided at the load center to automatically interrupt its associated branch circuit whenever the current in that branch circuit exceeds a predetermined value, thereby protecting the branch circuit connected devices from damage.

Generally speaking, a load center includes, in the case of a single phase installation, a pair of busbars having positive and negative potentials impressed thereon and a neutral assembly to which the load side of the branch circuit connected device may be electrically connected. The busbars usually include upstanding stab portions upon which the line side of a circuit breaker may be mechanically and electrically secured. A circuit is provided from the busbar, through the circuit breaker, through the load being protected, and back to the neutral assembly of the load center.

In three-phase load centers, there are provided three busbars each of which carry one phase of current, with a neutral terminal assembly usually provided at one end of the load center as part of the return path for current which passes from one of the busbars through a stab thereof, into the line side of the circuit breaker, out of the load side thereof, to the load being protected, and back to neutral assembly.

Various problems have been encountered in constructing load centers which can compactly maintain and insulate the busbars thereof with respect to each other and with respect to the enclosure, while at the same time being able to align such busbars so that their upstanding stab portions may accommodate the standard one inch circuit breakers in common use throughout he industry. Further-
more, problems have arisen in the electrical and mechanical conection between the busbars of the load center and the incoming energized cables. Various solutions have been proposed to simplify the connection between such cables and busbars but, for the main part, require some separate securing means generally in the form of a screw which mechanically secures a terminal lug to its associated busbar by means of a tapped aperture provided in the busbar.

Further problems encountered in the construction of load centers involve the containment and securement of the various cables which are returned from the devices being protected to the neutral assembly of the load center. Such cables generally enter the load center from all directions, depending upon the location of the device being protected relative to the load center, and must be guided or otherwise kept clear of the live or energized elements of the load center. In the past such incoming return cables have been loosely laid in gutters extending along opposite sides of the load center, but may become interferingly entangled with the busbars of the load center in the event that the incoming cables are made taut as a result of the load being moved away from the load center.

The instant invention has solved the above noted problems by providing a load center which includes a plurality of busbar moldings, modular in nature, which may be combined in any given number to produce the particular size of load center required for a particular application. In the single phase arrangement of the instant invention, each of the individual busbar moldings include open-ended busbar receiving slots alternately disposed along opposite edges of the molding, with such slots receiving the stabs of the two busbars of the single phase arrangement from opposite sides thereof to produce an extremely compact unit. Such slots are spaced one inch apart and automatically align the interwoven stabs received therein on one inch centers to accommodate the one inch circuit breakers in common use throughout the industry. It is to be understood that the slots could be spaced apart by one-half inch, or any other distance, to accommodate circuit breakers of other widths. Furthermore, each of the stab receiving slots includes a passageway communicating therewith such that once the upstanding stabs of the busbars have been inserted in the slots, the entire busbar may be moved along the longitudinal axis of the busbar molding so that the stabs frictionally enter the passageway to firmly lock the busbars in position relative to the molding.

In the three-phase arrangement of the instant invention, the busbar molding is similar to that described for the one-phase arrangement with the exception that there is provided a centrally disposed slot intermediate the alternately disposed open-ended slots. The centrally disposed slot receives the upstanding stab of the third busbar of the three-phase arrangement from beneath the busbar molding, and similar to the alternately disposed open-ended slots, includes a communicating passageway by which the entire third busbar may be moved along the longitudinal axis of the molding to lock the third busbar in place. In the three-phase arrangement the centrally disposed slot is equi-spaced between the alternately disposed open-ended slots, in this case, spaced apart by two inches, such that any three successive stabs of the first, second and third busbar will be aligned on one inch centers. Again, it is to be understood that the slots could be spaced apart by other than one inch in the event that a circuit breaker of other than one inch width is being utilized in the load center.

It should now be apparent, and it is deemed an important feature of the busbar moldings of the instant invention, whether they be for one-phase or three-phase load center arrangements, that the busbars may be operatively positioned and locked in place relative to the busbar molding and relative to each other without the necessity of additional securing means.

It is also an important feature of the instant invention that the busbar moldings of the instant invention provide many distinct functions in that (1) they compactly provide the necessary dielectric barrier between adjacent busbars; (2) they compactly provide support for the busbars; (3) they provide an interlock arrangement whereby the busbars are operatively locked in position without additional securing means; and (4) the busbars are locked in position relative to the busbar molding by means of their stab portions only; thereby leaving exposed the main current-carrying portions thereof. Therefore, in order to provide higher current-carrying capabilities of the load centers of the instant invention, it is merely necessary to use busbars, the width and cross-sectional area of the exposed main current-carrying portions of which can be non-interferingly chosen to accommodate the particular current rating desired.

In order to eliminate the screw and busbar-tapped aperture arrangement prevalent in the prior art to secure the incoming cables to the busbars of the load center, the instant invention provides a novel lug support molding by which the incoming cable, a terminal lug, and a busbar, may be mechanically and electrically secured with respect to one another without the necessity of additional securing means and particularly without the necessity of providing a tapped aperture in the busbars. Specifically, the lug support molding includes a lug receiving recess and a busbar receiving slot communicating with such lug receiving recess. A terminal lug having an opening passing centrally therethrough is dropped or seated in one of the lug receiving recesses of the lug support molding, and the end of the busbar to be connected to the incoming cable is passed through the busbar receiving slot in the rear of the lug support molding and into the central passageway provided in the terminal lug, thereby electrically and mechanically interconnecting the terminal lug and busbar, whereby the incoming cable may be electrically connected to the busbar by a simple connection to the terminal lug.

In its preferred construction, the above described lug support molding actually includes three such lug receiving recesses such that the ends of all three energized busbars, in a three-phase load center, may be securely aligned within the lug support molding while at the same time the electrical connection of such busbars and the terminal lugs seated in the aforementioned recesses may be assured without additional mechanical securing means being provided.

In the one-phase load center of the instant invention the cooperation of terminal lugs, lug support molding, and busbars is utilized to electrically connect the two energized incoming cables to their respective busbars, as described above, while the center terminal lug receiving recess of the lug support molding is utilized to electrically connect the neutral incoming cable to the neutral terminal assembly positioned at the opposite end of a load center by means of a conductive strap which is electrically connected to the neutral terminal assembly at one end thereof and which is inserted at the other end thereof into the center busbar receiving slot of the lug support molding. Thus, in the case of a single phase arrangement, the incoming neutral cable need not be passed along the gutter of the load center to be connected to the neutral assembly at the other end of the load center, but instead, is electrically connected to the neutral assembly by means of the conductive strap and the same lug support molding by which the energized cables are electrically connected to their respective busbars.

By providing that the incoming neutral cable terminate at and be secured to the lug support molding, the normal wire spacing requirements of the Underwriter Laboratories need only be provided at the one end of the load center where energized and neutral cables are secured to the lug support molding, and thus there is a substantial saving in the overall length of the load center by an amount which would otherwise be required by the Underwriter Labs when the incoming neutral cable is passed along the gutter of the load center and connected directly to the neutral assembly.

The invention further contemplates that there be provided a plurality of upstanding adjusting screws located around the perimeter of the load center whereby such upstanding adjusting screws, which have been previously utilized only for adjusting the busbars and circuit breakers secured thereto, relative to the front surface of the load center, may be further utilized to act as barriers which guide the incoming return cables and assure that such cables are maintained in the side running gutter portions of the load center completely free of the energized centrally located busbar arrangement. Such adjusting screws also hold the front cover in place while inserting the cooperating cover screws into the enclosure.

Accordingly, it is an object of the instant invention to provide a load center having improved features which increase operating capabilities, reduce space requirements, and manifestly simplifies the overall construction thereof.

It is another object of the instant invention to provide such a load center which includes a plurality of insulating busbar moldings, modular in nature, which may be combined to produce a compact load center required in a particular industrial application.

It is another object of the instant invention to provide such a load center wherein the busbar moldings thereof include oppositely disposed open-ended slots which receive and lock the upstanding stab portions of current-carrying busbars in a predetermined alignment.

Still another object of the instant invention is to provide such a load center wherein the principles of the modular busbar moldings may be extended to facilitate the alignment and positioning of the three busbars utilized in a three-phase arrangement.

Still another object of the instant invention is to provide such a load center wherein the various slots provided in the busbar moldings thereof are additionally provided with locking means for securely positioning the various busbars associated therewith with respect to the insulating member, with respect to one another, and with respect to the housing or enclosure of the load center without additional securing means.

Still another object of the instance invention is to provide such a load center wherein the relatively simple busbar moldings thereof perform many functions which include providing the necessary dielectric barrier between adjacent busbars; providing complete support for the busbar; providing an interlock arrangement whereby the busbars are operatively locked in position without additional securing means; and providing busbars to be locked in position relative to the busbar molding by means of their stab portions only, thereby leaving exposed the main current-carrying portions thereof.

Still another object of the instant invention is to provide such a load center which includes a novel lug support molding which functions to support and interconnect a terminal lug and a busbar associated therewith without the necessity of any additional securing means.

Still another object of the instant invention is to provide such a load center in which the novel lug support molding thereof is capable of mechanically and electrically interconnecting the three busbars of a three-phase arrangement and their respective terminal lugs such that the various energized incoming cables may be electrically connected to their associated busbars without the necessity of the screw and tapped aperture arrangement prevalent in the prior art.

Still another object of the instant invention is to provide such a load center in which a novel lug support molding thereof permits the two energized and a neutral incoming cable of a single phase arrangement to be secured to the interiorly located busbars and neutral assembly thereof in such a manner as to permit the connection of all incoming cables at one end of the load center thereof.

Yet another object of the instant invention is to provide such a load center in which the interconnection of the energized and neutral incoming cables associated therewith may be secured at one end of the load center in such a manner as to safely reduce the spacing normally required at the opposite end of such load center.

Still another object of the instant invention is to provide such a load center in which upstanding adjusting screws are spaced along the perimeter thereof in such a manner as to positively guide the incoming return cables associated with such load center along the gutters thereof whereby such return cables cannot possibly interfere with the centrally located energized parts of the load center with such adjusting screws also performing the function of holding the front cover of the load center in place while the cooperating cover screws are inserted.

Other objects and a fuller understanding of the instant invention may be had by referring to the following description and drawings, in which:

FIGURE 2 is an assembled plan view of one embodiment of the instant invention with the cover removed;

FIGURE 3 is an end view of the instant invention taken along the arrows 3—3 of FIGURE 2;

FIGURE 4 is an exploded perspective view showing the cooperation of the busbars and busbar molding of one embodiment of the instant invention;

FIGURE 5 is a detailed view of one embodiment of the instant invention showing the manner in which the busbars and busbar molding associated therewith are automatically interlocked;

FIGURE 6 is a view taken along the arrows 6—6 of FIGURE 5;

FIGURE 7 is a view taken along the arrows 7—7 of FIGURE 5;

FIGURE 8 is a view taken along the arrows 8—8 of FIGURE 5;

FIGURE 9 is a bottom view of the busbar molding shown in FIGURE 5;

FIGURE 10 is a plan view of the lug support molding of the instant invention;

FIGURE 11 is a front view of the lug support molding of FIGURE 10 taken along the arrows 11—11 thereof;

FIGURE 12 is a rear view of the lug support molding of FIGURE 10 taken along the arrows 12—12 thereof;

FIGURE 13 is a side view of the lug support molding of FIGURE 10 taken along the arrows 13—13 thereof;

FIGURE 14 is a side view of the lug support molding of FIGURE 10 taken along the arrows 14—14 thereof;

FIGURE 15 is a view similar to FIGURE 14 but showing the manner in which a terminal lug and busbar cooperate with the lug support molding of FIGURE 10;

FIGURE 16 is an exploded perspective view showing the cooperation of the busbars and busbar molding of the instant invention for a three-phase assembly;

FIGURE 17 is a plan view showing the cooperation of the busbar molding, busbars, and lug support molding of the instant invention for a three-phase arrangement; and FIGURE 18 is a side view of FIGURE 17 taken along the arrows 18—18 thereof.

Figure 1:
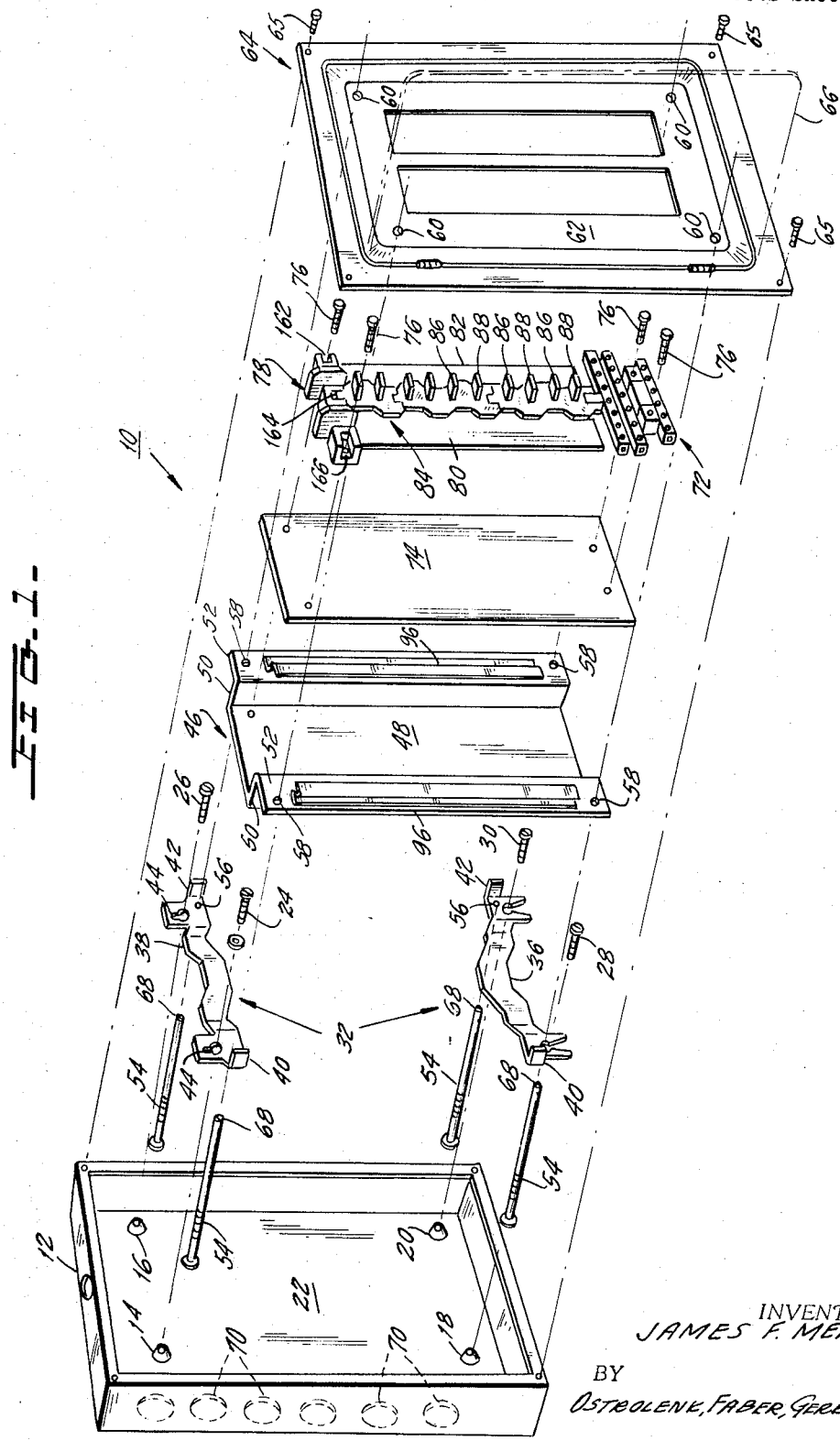
FIGURE 1 is an exploded perspective view of one embodiment of the load center of the instant invention.

Referring to FIGURE 1, there is shown an exploded perspective view of the load center 10 of the instant invention, in this figure, arranged to accommodate a single phase installation. The load center 10 includes a generally rectangular enclosure 12 including four tapped protrusions 14, 16, 18 and 20 along the rear surface 22 thereof. The tapped protrusions 14–20 receive the threaded screws 24, 26, 28 and 30, respectively, so as to support a two-piece bracket 32 in the following manner.

Bracket 32 includes legs 36 and 38 each of which include upstanding tab portions 40 and 42 on opposite ends thereof and furthermore include enlarged openings 44 by which the legs 36 and 38 may be initially passed over the heads of screws 24, 26, 28 and 30 and onto the shank portions thereof for securement to the rear surface 22.

Positioned immediately above the legs 36 and 38 is a U-shaped pan 46 which includes a rearwardly disposed central portion 48, upstanding side portions 50, and a pair of transverse flanges 52 extending therefrom. U-shaped pan 46 is supported relative to the brackets 32 by means of relatively long, centrally screw-threaded, adjusting rods 54 which pass through apertures 56 in the legs 36 and 38 of the brackets 32 and into screw-threaded engagement with apertures 58 provided in the transverse flanges 52 of the U-shaped pan 46. Adjusting rods 54 eventually pass through apertures 60 in a depressed area 62 of the cover portion 64 of the enclosure such that when the door 66 thereof is opened the slotted ends 68 of the adjusting rods 54 will be exposed and may be rotated by means of a screw driver or like instrument to raise or lower the U-shaped pan 46 and circuit breakers secured thereto relative to the brackets 32 and the rear surface 22 of the enclosure. The cover 64 is secured to the enclosure 12 by means of screws 65.

As will be further explained, the adjusting screws 54 while performing a primary function of permitting adjustment of the pan 46 relative to the rear surface 22 of the enclosure, perform a secondary function in that they guide the neutral or returned cables, illustrated at 95 in FIGURE 2, from the various loads being protected by the load center 10 from their various points of entry through the knock-out portions 70 of the enclosure 12 to their eventual connection to the neutral terminal assembly indicated at 72 in FIGURE 1.

Positioned above the rear surface 48 of U-shaped pan 46 is a sheet of insulation 74 which is held in place within the upstanding side portions 50 of pan 46 by means of screws 76 which pass through a lug support molding 78, to be described in greater detail, and the neutral terminal assembly 72, respectively, into screw-threaded engagement with the rear surface 48 of pan 46.

Located between the lug support molding 78 and neutral terminal assembly 72 is the busbar arrangement comprising, for the single phase arrangement illustrated in FIGURE 1, a pair of busbars 80 and 82 securely positioned with respect to busbar molding 84 in a manner to be further described.

As will be further described, the alternately disposed stabs 86 and 88 of busbars 80 and 82, respectively, pass through the busbar molding 84 whereby, as may be seen in FIGURE 3, the line side of the various circuit breakers 90 may be mechanically and electrically secured thereto in the following manner.

Each circuit breaker 90 includes a recess indicated as 92 in FIGURE 3 which receives an extending portion 94 of the Z-shaped strip-like hook 96 secured on the transverse flanges 52 of U-shaped pan member 46. The circuit breaker 90 is first positioned under such hooks 96 and then rotated down onto the upstanding stabs in a well known manner such that the breaker 90 is now mechanically positioned in the load center. Simultaneously the line side stab receiving fingers of the circuit breaker 90, not shown in FIGURE 3, are electrically connected to the upstanding stab associated therewith such that a circuit may be completed which would comprise, for example, the busbar 80, the upstanding stab 86, the line side of the breaker 90, through the circuit breaker 90, out the load side thereof, and to the load being protected thereby. As noted previously, the return path for the load being protected would consist of a return cable which enters the enclosure 12 through the knock-out panels 70 thereof and is guided by adjusting screws 54 along the gutters 55 of the load center to its ultimate connection to one of the screws provided on the neutral assembly 72.

The plan view of FIGURE 2 shows the manner in which the incoming return cable 95 enters one of the knock-out panels 70 and is guided by the adjusting screws 54 along the gutter 55 of the enclosure 12 to its eventual connection to one terminal 100 of the neutral terminal assembly 72.

As can be most clearly seen in FIGURE 2, the busbar molding 84 comprises a plurality of individual smaller insulative units 106 which are interlocked by means of dove-tail arrangements 104. One such busbar molding unit 106 is shown in a perspective detail in FIGURE 4 and is seen to include first and second edges, generally identified 108 and 110, along opposite sides thereof. Alternately disposed along the opposite edges 108 and 110, respectively, of the insulative member 106 are open-ended slots 112, 114, 116 and 118 which receive the stabs 86 and 88 of busbars 80 and 82, respectively, in the following manner.

The busbars 80 and 82 are similar in construction and to facilitate description thereof, only the busbar 82 will be described. Busbar 82 has a thickness 130 determined by the distance between the upper surface 120 and the lower surface 122 thereof. Extending laterally from the busbar 82 and in the same plane therewith is a connecting portion 124, of the same thickness 130, which integrally joins the upstanding stabs 88 with the busbar 82. The stabs 88 are spaced on two inch centers and are also of the same thickness 130. Thus the entire busbar 82 including the connecting portions 124 and stabs 88 may be preferably manufactured of a single sheet of metal, generally copper, which can be easily cut and bent to form the shape shown in FIGURE 4.

Furthermore, and as will be further described, since the busbar 82 is secured and positioned relative to the insulative member 106 by means of the stabs 88 and the connecting portions 124 associated therewith, the dimensions 126 and 130 of the exposed major current-carrying portion 83 of the busbar 82 may be selectively chosen to provide the current-carrying capabilities needed in the particular load center under consideration. Thus, as indicated in FIGURE 4, the busbar 82 can be manufactured such that the shown width 126 is enlarged to the width indicated at 128.

Furthermore, in the event that aluminum rather than copper is preferred for the busbars 80 and 82, the increased cross-sectional area necessary for such metal could easily be provided by increasing the thickness 130 established between the upper and lower surfaces 120 and 122 of the busbar 82 to the thickness indicated at 132 in FIGURE 4.

In summary, it becomes apparent, and is regarded as an important feature of the instant invention, that since the busbars 80 and 82 (and for that matter the busbars 134, 136 and 138 of FIGURE 16 for the three-phase arrangement), are secured to the insulative member 106 (and 139 in FIGURE 16) by means of the connecting portions 124 and upstanding stabs 86 and 88, respectively, the current-carrying capabilities of the load centers constructed in accordance with the instant invention may be simply and easily varied by simply enlarging the cross-sectional area of the major current-carrying portions 83 of the busbars utilized.

Referring most specifically now to FIGURES 4–9, the manner in which the busbars 80 and 82 are securely held in aligned position relative to each other and to the insulative member 106 will now be explained. The insulative member 106 includes generally planar top and bottom surfaces 140 and 142, respectively, in which the alternately disposed open-ended slots 112, 114, 116, 118 are provided. As can be most clearly seen in FIGURES 7, 8 and 9, extending below the bottom surface 142 of the insulative member 106 is a central portion 144 which runs along the entire length of the insulative member 106. Central portion 144 includes shelves 146 located beneath the open-ended slots 114–118 and spaced from the lower surface 142 of insulative member 106 by a distance which is just slightly less than the thickness of the busbar connecting portions 124 which in the preferred embodiment is also the thickness 130 of the busbars. The purposes of such shelves will become apparent immediately below. Central portion 144 is further provided with a countersunk recess 148 and aperture 150 through which securing means may pass in securing the insulative member 106 to the rear surface 48 of the U-shaped pan 46.

As can be most clearly seen in FIGURES 4 and 5, insulative member 106 is further provided with passageways 152 extending generally longitudinally along the length of the insulative member 106, which passageways communicate with the alternately disposed slots 112, 114, 116 and 118 to provide a built-in locking feature in the following manner.

Referring to FIGURE 5, the busbar 80 is automatically supported and compactly interlocked in position on the insulative member 106 by inserting the stabs 86 into the open-ended slots 112 and 116, indicated by the arrows 154, until the leading edge of such stabs abut the termination 156 of such slot. During this movement the connecting portions 124 which are transverse to the stabs 86, are slid beneath the lower surface 142 and onto the shelves 146 (see FIGURE 7). Next, the entire busbar 80 is moved along the longitudinal axis of the insulative member 106, as indicated by the arrows 158 in FIGURE 5, with the stabs 86 being received by the longitudinally extending passageways 152. Simultaneously, the connecting portions 124 are frictionally urged between the shelves 146 of the central portion 144 and the under surface 142 of insulative member 106, thus automatically locking the busbar 80 in position on the insulative member 106 such that the stabs 86 thereof are upstanding and separated by distance of two inches.

The busbar 82 is inserted in exactly the same manner with the stabs 88 thereof being initially inserted into the open-ended slots 114 and 118 until the forward edges of such stabs engage the terminations of such slots. Then the busbar 82 is moved longitudinally of the insulative member 106 such that the stabs 88 are received by the passageways 152 and the connecting portions 124 are frictionally inserted in the space defined between the shelves 146 of central portion 144 and the lower surface 142 of the insulative member 106.

Thus the busbars 80 and 82 are compactly and insulatingly supported with respect to one another, while at the same time such busbars are automatically locked in position on insulative member 106 without the need of additional securing means with their respective stabs 86 and 88 being interwoven in an alternate sequence spaced apart on one inch centers.

FIGURE 8 shows a cross-sectional side view of such an arrangement and further shows the manner in which the circuit breakers 90 are positioned over and secured to the upstanding stabs 86 and 88.

It is to be understood that any number of insulative members 106 may be combined to produce the overall length necessary to accommodate a given number of circuit breakers, or in the alternative one insulative member 106 could be manufactured having enough alternatively disposed open-ended slots to accommodate the number of stabs necessary in a particular installation.

Returning to FIGURE 4, it is noted that busbars 80 and 82 are shown to terminate in a forward extending terminal portion 160 and 161, respectively. Such designation has been illustrated only for the purposes of showing the cooperation of such busbars 80 and 82 with the lug support molding 78, as will be described below, and would not be present were FIGURE 4 intended to represent a given section of the busbar arrangement intermediate its ends thereof.

Turning to FIGURES 10–15, there is shown in detail the lug support molding 78 which is constructed of insulating material and is seen to include a plurality of lug receiving recesses 162, 164 and 166. Recess 162 is defined by an upstanding wall 168, a rear wall portion 170, and upstanding wall barrier 172. Recess 164 is defined by wall barrier 172, a rear wall 174 and a second barrier 176. Recess 166 is defined by the second wall barrier 176, a rear wall 178 and a side wall 181.

The front view of FIGURE 11 and the side view of FIGURE 14 most clearly show the depth of the recesses 162, 164 and 166; while FIGURES 11 and 12, which clearly show the upstanding rear walls 170, 174 and 178, also show that such rear walls are provided with slots 180, 182 and 184, respectively, through which the forwardly extending terminal portions 160 and 161 of the busbars 80 and 82 may pass to enter into the lug receiving recesses 162 and 166. See also FIGURE 2 wherein the upstanding rear walls 170 and 178 of the lug support molding 78 are shown as having the connecting portions 160 and 161 of the bus bars 80 and 82 extending therethrough.

Returning to FIGURE 15, the novel cooperation of: the terminal portions 160 and 161; the lug support molding 78; terminal lugs 186; and the incoming energized cables 188 and 189 of the single phase arrangement will now be explained; it being understood that the ultimate purpose of such arrangement is to mechanically and electrically interconnect the incoming cables 188, 189 and the forward extending terminal portions 160 and 161 of the busbars 80 and 82 without the need of additional securing means therebetween. As noted previously, prior art methods for such connection have required fastening means such as a screw which passes through the terminal lugs and into a tapped aperture provided in the busbar.

The first step in the assembly is to seat the terminal lugs 186 in the terminal lug recesses 162 and 166 with the bottom surfaces 190 of the lugs 186 resting on the seats 192, 194 of the recesses 162 and 166 such that the central passageway 196 passing through the terminal lugs 186 communicates with the rear slots 180 and 184 provided in the rear walls 170 and 178, respectively, of the recesses 162 and 166.

As the second step, the terminal portions 160 and 161 of the busbars 80 and 82, respectively, are inserted through the slots 180 and 184 in the rear walls 170 and 178, respectively, and into the central passageway 196 of the terminal lugs 186 which are communicating with such slots such that the terminal portions 160 and 161 lie above the lower surfaces 190 of the terminal lugs 186 and thereby retain the entire terminal lug in fixed position on the lug support molding 78.

As shown in FIGURES 2 and 15, the energized cables 188 and 189, which in the single phase arrangement normally carry the positive and negative potential, may then be easily inserted in passageway 196 of lugs 186 above terminal portions 160 and 161 with the entire assembly secured by the screw or other fastening member 198 which passes through an upper surface 200 of the terminal lugs 186.

Thus the terminal portions 160 and 161 of the busbars 80 and 82 are mechanically and electrically secured to the incoming cables 188, 189 without the necessity of additional securing means, and furthermore the ends of the busbars 80 and 82 upon which the connecting portions 160 and 161 are terminated, are rigidly held in place relative to the U-shaped pan 46 upon which they reside.

Thus far in the description of the single phase installation only the electrical and mechanical connection between the busbars 80 and 82 and the energized cables 188 and 189 has been referred to. At this point therefore reference will be had to FIGURE 2 wherein the neutral cable 202 of a single phase arrangement is seen to enter the enclosure 12 at the same location as the energized cables 188 and 189 and is secured to a terminal lug 204 in exactly the same manner as the cables 188 and 189 were secured to their respective terminal lugs 186. However, electrically and mechanically connected to the terminal lug 204, in the same manner as the connecting portions 160 and 161 of the busbars 80 and 82 were electrically and mechanically secured to their respective terminal lugs 186, there is provided a conductive strap 206 which passes through the rear wall 174 of central terminal lug recess 164 and into the central passageway (not shown) of the terminal lug 204, similar to the central passageway 196 of terminal lugs 186 shown in FIGURE 15.

Conductive strap 206 fantails into two cables 208 and 210 which are disposed on opposite sides of the busbar molding 84, but beneath the busbars 80 and 82, and extend to the opposite end of the enclosure 12 wherein they are electrically connected to terminals 212 and 214 of the neutral terminal assembly 72.

Thus for the one-phase arrangement shown in FIGURE 2, the neutral cable 202 may be terminated at the lug support molding 78 and secured to the terminal lug 204 for ultimate electrical connection by cables 208, 210 to the neutral terminal assembly 72 in the manner described above, thereby eliminating the necessity for such neutral cable 202 to go completely around the adjusting screws 54 and down to the opposite end of the enclosure 12 to be connected directly to the neutral assembly 72. This roundabout connection whereby the neutral cable extends along the gutter of the enclosure all the way to the opposite end of the load center for connection to the neutral assembly, has been prevalent in the prior art and is to be contrasted to the simplified system of the instant invention achieved by means of the novel lug support moldings 78.

It should be pointed out that in the prior art arrangement wherein the incoming neutral cable extends all the way to the opposite end of the enclosure to be connected directly to the neutral terminal assembly, Underwriter Laboratory requirements dictate that there be provided large clearance between the neutral terminal assembly and the end such as 216 of the enclosure 12 shown in FIGURE 2.

In the instant invention wherein the neutral cable 202 may be terminated at and directly secured to the lug support molding 78 at the same end of the enclosure as the energized cables 188 and 189 are secured to the busbars, the clearance space which was necessary at the other end of the enclosure in the prior art constructions may be eliminated to materially shorten the overall length of the load center 10.

The sequence of assembling the load center shown in FIGURES 1 and 2 is as follows. The busbars 80 and 82 are first slid into the oppositely disposed open-ended notches of the insulating molding 106, as described with respect to FIGURE 4, and then moved longitudinally such that the stabs 86 and 88 are automatically locked in the passageways 152 by means of the frictional engagement of the connecting portions 124 and the shelves 146.

Next the busbar molding, shown generally as 84 in FIGURE 2, with the busbars 80 and 82 securely held thereby, is screwed down to the rear surface 48 of the U-shaped pan 46 with the insulating sheet 74 therebetween.

The lug support molding 78, described in detail in conjunction with FIGURES 10–15, is then put in position such that the forward terminal portions 160 and 161 of the busbars and the conductive strap 206 pass through the slots 180, 184 and 182 in the rear surfaces 170, 178 and 174 thereof, it being noted that the terminal lugs 186 and 204 have already been positioned in the recesses 162, 166 and 164. Thus with the lug support molding 78 firmly secured through the insulating sheet 74 to the rear surface 48 of the pan 46, the entire busbar arrangement is rigidly secured in place while simultaneously the busbars and neutral assembly 72 have been electrically connected to the terminal lugs 186 and 204 such that the incoming energized and neutral cables 188, 189 and 202 may be eventually secured to lugs 186 and 204.

The neutral terminal assembly 72 is similarly secured through the insulating sheet 74 to the rear surface 48 of the U-shaped pan 46, and the cables 208, 210 secured to terminals 212 and 214.

With the completed busbar arrangement secured to the pan 46 the various breakers 90 may be secured in place by inserting the load side recesses 92 thereof under the Z-shaped strips 96 provided on the flanges 52 of the pan 46 and rotating such breakers onto the upstanding stabs 86 and 88 of the busbars 80 and 82.

Finally, the completed pan assembly may receive the centrally screw-threaded adjusting rods 54 which first pass through the members 32 and through apertures 58 provided on the flanges 52 of the pan 46. Next the members 32, now supporting the pan 46, may be fastened to the rear surface 22 of the enclosure 12 by means of screws 24, 26, 28 and 30 which pass through the enlarged openings 44 of the legs 38 of the members 32.

The cover 64 is secured to the enclosure by means of the screws 65 such that the slotted projecting ends 68 of the adjusting rods 54 pass through apertures 60 in the depressed portion 62 of the cover 64.

With the door 66 of cover 64 open, the slotted ends 68 of the adjusting rods 54 are exposed whereby rotation of such rods will move the entire pan 46, and breakers positioned thereon, forward or backward relative to the rear surface 22 of the enclosure 12 such that the upper surfaces 220 (see FIGURE 3) of circuit breakers 90 can be made flush with the under surface of the depressed portion 62 of cover 64.

As previously noted, the neutral return cables connected between the load side of the devices being protected and the neutral terminal assembly 72, enter the enclosure 12 through the many knock-out panels 70 provided in the side walls of the enclosure 12 and are guided along the gutters 55 of the enclosure 12 by means of the adjusting screws 54 in such a manner that it will be impossible for such neutral return cables to ever interfere with or become entangled in the busbar arrangement located centrally of the enclosure.

Turning now to FIGURES 16–18, there is shown in detail the manner in which the instant invention may be easily modified to provide a load center for a three-phase installation. It should be noted that the load center utilized for a three-phase installation is identical to the one described above for the one-phase installation with only two exceptions outlined below.

First, the insulative member 139, shown in FIGURES 16, 17 and 18, has been modified such that the alternately disposed open-ended slots 222 and 224 are spaced from one another by a distance of two inches such that an enclosed slot 226 may be equidistantly spaced one inch from slots 222 and 224. Similarly, the upstanding stabs 228 and 230 of the busbars 134 and 138, respectively, have been spaced apart by three inches such that they may be received by slot pairs 222, 222 and 224, 224, respectively, such pairs now being separated by a total distance of three inches also.

Slots 222 and 224 are similar to slots 112 and 114, shown in FIGURE 4, and include longitudinally extending passageways 232 communicating with such slots whereby the stabs 230 and 228 may be moved longitudinally along the length of the insulative member 139 once such stabs have been inserted within the notches 222 and 224. Furthermore, beneath the surface of the slots 222 and 224 and provided in the depending portion 236 of the insulative member 139 are shelves 240 upon which the connecting portions 244 of the busbars 134 and 138, respectively, may be slid to lock such busbars within the locking passageways 232 in a manner exactly the same as that described with respect to the locking feature provided in FIGURE 4.

Additionally, however, there is provided a third busbar 136, to provide three-phase capabilities, with such busbar including upstanding stab portions 246 spaced on three inch centers, which stab portions are received through the centrally disposed apertures 226 so as to interweave the stabs 228, 230 and 246 on one inch centers as shown in FIGURE 18.

Insulative member 139 further includes downward projections 248 located beneath the centrally disposed apertures 226, with such projections 248 being provided with shelf means 250, similar to the shelves 240 located beneath alternately disposed open-ended slots 222 and 224, to frictionally engage the connecting portions 252 of busbar 136 when the stabs 246 thereof are first inserted through the enclosed slots 226 and then move forward longitudinally along the length of insulative member 139 to lock the busbar 136 in place in the same manner as busbars 134 and 138 are moved forward to frictionally engage their connecting portions 244 thereof with the shelves 240 located beneath slots 222 and 224.

In assembling busbar arrangements utilized in a three-phase arrangement, the busbars 134 and 138 are first inserted from opposite sides of the insulative member 139 such that their stabs 228 and 230, respectively, enter the open-ended slots 222 and 224. The busbars are then moved forward such that their connecting portions 244 are frictionally engaged by the shelf 240 to secure such busbars in place.

An insulating sheet, identified at 253, is placed over the busbar 136 with the stabs 246 of busbar 252 extending through openings 254 provided in insulating sheet 253.

Finally, the stabs 246 of busbar 136 are inserted up through the enclosed slots 226 and the entire busbar moved forward such that the stabs are received by passageways 256 in the same manner that the stabs 228 and 230 of busbars 134 and 138 are received by the passageways 232 which communicate with open-ended slots 222 and 224.

The second main distinction between the three-phase arrangement and the single phase arrangement is illustrated in FIGURES 16, 17 and 18, which show that all three forwardly extending connecting portions 258, 260 and 262 of the busbars 134, 136 and 138 are inserted in the rear slots 180, 182 and 184 of the lug support molding 78 for electrical and mechanical connection to the terminal lugs 186 and 204 shown in the plan view of FIGURE 2 for the single phase arrangement. In this respect it is noted that the central or lower busbar 136 is offset at 264 to permit its entry into the central slot 182 provided in the rear wall 174 of the lug support molding 78.

Thus in the three-phase arrangement all three incoming energized cables are secured to terminal lugs seated in the terminal lug receiving recesses 162, 164, 166 of the lug support molding 78 such that a neutral incoming cable will pass around and be guided by the adjusting screws 54 for ultimate connection to neutral terminal assembly 72.

The assembly of the three-phase arrangement is substantially identical to that described for the one-phase arrangement with the only exceptions being that the three busbars are connected into the insulative molding 139 in the manner outlined above, and that the three connecting portions 258, 260 and 262 of the busbars 134, 136 and 138 enter through the rear slots in the lug support molding to be electrically connected to their respective terminal lugs to which the three energized incoming cables may be secured.

Thus there has been described a novel load center for use in both one-phase and three-phase installations which includes a novel busbar mounting arrangement which compactly spaces, maintains, supports, insulates and locks all the busbars in place with respect to each other and with respect to the busbar molding without additional securing means; which includes a novel lug support molding by which the various busbars utilized may be electrically and mechanically connected to their respective incoming cables without the need for securing means fastening the terminal lugs associated therewith to the various busbars; and which further utilizes a plurality of adjusting screws positioned along the perimeter thereof to guide various cables along the outside edges or gutters of the load center to their ultimate connection to the neutral terminal assembly thereof in such a manner as to prohibit such cables from interfering with the busbar arrangements disposed centrally of the load center.

Although there has been described a preferred embodiment of this novel invention, many variations and modifications will now be apparent to those skilled in the art. Therefore, this invention is to be limited, not by the specific disclosure herein, but only by the appending claims.

What is claimed is:
1. In combination:
an insulating member having first and second sides defined by first and second longitudinally extending edges therealong, said insulating member including:
first means spaced along said first longitudinally extending edge for receiving a first bar from said first side of said insulating member, and second means spaced along said second longitudinally extending edge at a predetermined distance from said first means for receiving a second bus bar from said second side of said insulating member; and
first and second bus bars located on said first and second side of said insulating member, respectively, said first and second bus bars including first and second projecting portions, respectively, which are received by said first and second means of said insulating member, respectively.

2. The combination of claim 1, wherein said first and second means include locking means for securely positioning said first and second bus bars with respect to said insulating member and with respect to one another without the necessity of additional securing means.

3. The combination of claim 1, wherein said first and second means of said insulating member include first and second elongated slots, respectively, which open on said first and second longitudinally extending edges, respectively; said first and second bus bars include longitudinally extending, substantially planar top and bottom surfaces; and said projecting portions of said first and second bus bars include first and second stab portions, respectively, which extend transversely to said top surfaces of said first and second bus bars, respectively; said first and second stab portions of said first and second projecting portions of said first and second bus bars passing through said first and second slots of said first and second means, respectively, and being maintained in a longitudinal alignment with respect to one another which is parallel to said first and second edges.

4. The combination of claim 3, wherein said stab portions of said first and second projecting portions have a thickness which corresponds to the thickness of said bus bars as determined by the distance between said top and bottom surfaces thereof; and, said first and second bus bars have a predetermined width which is selectively chosen in accordance with the magnitude of current to be carried by said bus bars.

5. The combination of claim 3, wherein said first and second means further include first and second locking means for securely positioning said first and second bus bars with respect to said insulating member and with respect to one another without the necessity of any additional securing means, said first and second locking means comprising a first and second passageway which communicates with said first and second slots, respectively, to receive said stab portions of said first and second projecting portions to permit said first and second bus bars to be moved parallel to said first and second edges into tight-fitting relationship with said insulating member.

6. The combination of claim 5, wherein said insulating member includes substantially planar top and bottom surfaces which lie in planes substantially parallel to the top surfaces of said first and second bus bars, and a central portion depending from said bottom surface of said insulating member, said central portion including integral shelf means spaced a predetermined distance beneath said first and second slots for supporting said bus bars.

7. The combination of claim 6, wherein said predetermined distance is slightly less than the thickness of said bus bars as determined by the distance between the top and bottom surfaces thereof; and said shelf means is also spaced beneath said first and second passageways such that said bus bars may be frictionally captivated between said shelf means and said bottom surface of said insulating member when said bus bars are moved parallel to said first and second longitudinally extending edges.

8. The combination of claim 3, wherein said insulating member further includes third means spaced at a predetermined location intermediate said first and second means for receiving a third bus bar, said third means including a third elongated slot extending parallel to said first and second slots and spaced midway therebetween, said third slot being completely enclosed by said insulating member; and further including a third bus bar located under said insulating member and said first and second bus bars, said third bus bar having longitudinally extending edge surfaces which define the limits of a substantially planar top and bottom surface thereof, said third bus bar including a projecting portion which is received by said third slot of said insulating member.

9. The combination of claim 8, wherein said projection portion of said third bus bar includes a third stab portion which extends transverse thereto, said third stab portion being centrally located between said edge surfaces of said third bus bar, said third stab portion of said third bus bar passing through said third slot and being maintained in longitudinal alignment with said first and second stab portions.

10. The combination of claim 9, wherein said third means includes third locking means for securely positioning said third bus bar with respect to said insulating member and with respect to said first and second bus bars without the necessity of additional securing means, said third locking means including a third passageway which communicates with said third slot to receive said third stab to permit said third bus bar to be moved parallel to said first and second edges into tight-fitting relationship with said insulating member.

11. The combination of claim 10, wherein said insulating member includes substantially planar top and bottom surfaces which lie in planes substantially parallel to the top surfaces of said first, second and third bus bars, and a central portion depending from said bottom surface of said insulating member; said central portion including integral shelf means spaced a predetermined distance beneath said first and second slots and their respective first and second passageways for supporting said first and second bus bars, respectively, and a depending projection extending therefrom, said depending projection of said central portion having a recess located a predetermined distance beneath said third passageway to support said third bus bar when it is moved parallel to said first and second edges such that said third stab is received by said third passageway.

12. The combination of claim 9, wherein said first, second and third stab portions have a thickness which corresponds to the thickness of their respective bus bars as determined by the distance between their top and bottom surfaces, respectively, said first, second and third bus bars having a predetermined width which is selectively chosen in accordance with the magnitude of current to be carried by said bus bars.

13. The combination of claim 11, and further including an insulating sheet captively positioned between the top surface of said third bus bar and the bottom surfaces of said first and second bus bars.

14. The combination of claim 13, wherein said third stab portion is stamped out of a central portion of said third bus bar, leaving a centrally located aperture in said third bus bar; said insulating sheet being provided with an aperture therein which is aligned with said centrally located aperture to allow said depending projection of said central portion to pass therethrough.

15. The combination of claim 3, wherein said insulating member includes substantially planar top and bottom surfaces which lie in planes substantially parallel to the top surfaces of said first and second bus bars, and a central portion depending from said bottom surface of said insulating member, said central portion including integral shelf means spaced a predetermined distance beneath said first and second slots for supporting said first and second bus bars, respectively; said projecting portions of said first and second bus bars each including a connecting portion which terminates with said first and second stabs, respectively, said connecting portions of said first and second projecting portions being supported by said integral shelf means of said central portion.

16. The combination of claim 15, wherein said first and second stab portions and third respective connecting portions have a thickness approximately equal to the space between said bottom surface of said insulating member and said shelf means, and said bus bars have a cross-sectional area the width and thickness of which are selectively chosen in accordance with the magnitude of current to be carried by said bus bars.

17. A load center for distributing electrical energy from a plurality of incoming cables including a neutral cable and at least one energized cable, said load center comprising:
a bus bar assembly including at least a first bus bar, said first bus bar having terminal means spaced at predetermined locations therealong for permitting the connection of electrical apparatus thereto;
first and second terminal lugs to which an energized and neutral cable, respectively, may be connected;
a lug support molding located adjacent a first end of said first bus bar, said lug support molding having first means provided therein for mechanically and electrically connecting said one end of said bus bar to said first terminal lug and for securely positioning said first terminal lug and said one end of said bus bar with respect to said lug support molding without the necessity of additional securing means;
a neutral terminal assembly positioned adjacent a second end of said bus bar;
electrical conductor means for electrically connecting said neutral terminal assembly to said second terminal lug;
said lug support molding further including second means provided therein for mechanically and electrically connecting said electrical conductor means to said second terminal lug and for securely positioning said second terminal lug and electrical conductor means with respect to said lug support molding without the necessity of additional securing means;
whereby said incoming energized and neutral cables may be connected to their respective terminal lugs adjacent said one end of said bus bar.

18. The load center of claim 17, wherein said bus bar assembly, said lug support molding, and said neutral terminal assembly are positioned within an enclosure having first and second ends, said lug support molding being spaced from said first end of said enclosure by a first predetermined distance selectively chosen in accordance with the current being carried by said energized cable, and said neutral terminal assembly being spaced from said second end of said enclosure by a second predetermined distance which is substantially less than said first predetermined distance and which is determined independent of the current being carried by said energized cable.

19. The load center of claim 17, wherein said lug support molding includes first and second lug receiving recesses and a first and second conductor receiving apertures which communicate with said first and second lug receiving recesses, respectively; said first and second terminal lugs being seated in said first and second lug receiving recesses, respectively; and including a passageway therethrough which communicates with said first and second conductor receiving apertures, respectively; said one end of said bus bar and said electrical conductor means passing through said first and second conductor receiving apertures, respectively, into the passageway of the terminal seated in the recess associated therewith; whereby said one end of said bus bar, said electrical conductor means, their respective terminal lugs, and said lug support molding are all securely positioned with respect to one another without the necessity of additional securing means.

20. The load center of claim 19, wherein said bus bar assembly further includes a second bus bar extending substantially parallel to said first bus bar, said second bus bar including terminal means spaced at predetermined locations therealong for permitting the connection of electrical apparatus thereto; and an insulating member having first and second sides defined by first and second longitudinally extending edges therealong, said insulating member including first and second means spaced at a predetermined distance from each other along said first and second edges, respectively, for supportingly receiving said first and second bus bars from said first and second sides of said insulating member, respectively; said lug support molding including a third lug receiving recess and a third conductor receiving aperture communicating therewith; a third terminal lug seated in said third recess and including a passageway therethrough which communicates with said third conductor receiving aperture when said third terminal lug is seated in said third recess; a first end of said second bus bar passing through said third conductor receiving aperture into said passageway of said third terminal lug, whereby said first ends of said first and second bus bars, said electrical conductor means, said first, second, and third terminal lugs, and said lug support molding can be securely positioned with respect to one another without additional securing means.

21. The load center of claim 17 and further including an enclosure which has a generally planar rear surface, said bus bar assembly, said lug support molding, and said neutral terminal assembly being removably secured to a pan which is movable with respect to said rear surface of said enclosure; a plurality of adjusting means cooperating with said pan and said rear surface and positioned at predetermined locations around said pan for selectively adjusting the distance between said rear surface and said pan and for simultaneously maintaining conductors which must pass alongside of said bus bar assembly in being connected to said neutral terminal assembly at a fixed minimum distance from said bus bar assembly.

22. A load center for distributing electrical energy from a plurality of incoming cables including a neutral cable and a plurality of energized cables, said load center comprising: a bus bar assembly including a plurality of bus bars each having terminal means spaced at predetermined locations therealong for permitting the connection of electrical apparatus thereto; a plurality of terminal lugs to which respective ones of a plurality of energized cables may be connected; and a lug support molding located adjacent first ends of said plurality of bus bars, said lug support molding having interlock means provided therein for mechanically and electrically connecting said first ends of said plurality of bus bars to respective ones of said plurality of terminal lugs and for securely positioning said first ends of said bus bars and said plurality of terminal lugs with respect to one another without the necessity of additional securing means; and further including a neutral terminal assembly located adjacent a second end of said plurality of bus bars, said neutral terminal assembly including a neutral terminal lug to which a neutral cable may be connected; said bus bar assembly, said lug support molding and said neutral terminal assembly being removably secured to a pan which is adjustably positionable with respect to a rear surface of an enclosure in which said pan is housed; and adjusting means positioned at predetermined locations around said pan for selectively adjusting the distance between said rear surface and said pan and for simultaneously maintaining said incoming neutral cable alongside said bus bar assembly at a fixed minimum distance therefrom.

23. The load center of claim 22 wherein said adjusting means comprises a plurality of upstanding rods positioned at predetermined spaced locations along said pan, said rods including threaded portions which threadably engage said pan to cause movement thereof in response to rotation thereof, said rods serving the double purpose of permitting selective positioning of said pan within said enclosure while at the same time maintaining said neutral cable alongside said bus bar assembly at a fixed minimum distance therefrom.

24. The load center of claim 22 wherein said bus bar assembly further includes an insulating member having first and second sides defined by first and second longitudinally extending edges therealong; said insulating member including first and second means spaced a predetermined distance from each other along said first and second edges, respectively, for supportingly securing first and second ones of said plurality of bus bars from said first and second sides of said insulating member, respectively, and third means positioned intermediate said first and second edges and midway between said first and second means for receivingly supporting a third of said plurality of bus bars from underneath said insulating member.

25. The load center of claim 24 wherein said lug support molding includes first, second, and third lug receiving recesses and first, second, and third conductor receiving apertures which communicate with said first, second and third lug receiving recesses, respectively; said plurality of terminal lugs including a first, second, and third terminal lug each of which includes a passageway therethrough, said first, second and third terminal lugs being seated in said first, second and third lug receiving recesses, respectively, with their passageways communicating with the conductor receiving apertures thereof, said first ends of said first and second bus bars and a first end of said third bus bar passing through said first, second, and third conductor receiving apertures, respectively, into the passageways of said first, second, and third terminal lugs; whereby said bus bars, said terminal lugs, and said lug support molding are securely positioned with respect to one another without the necessity of additional securing means.

References Cited

UNITED STATES PATENTS

| | | | |
|---|---|---|---|
| 2,738,473 | 3/1956 | Johnson | 317—119 XR |
| 2,964,726 | 12/1960 | Michals | 339—272 XR |
| 3,171,708 | 3/1965 | Salamone | 339—272 XR |
| 3,219,887 | 11/1965 | Gerg et al. | 317—119 XR |
| 3,283,213 | 11/1966 | Kosanda | 317—99 |

ROBERT S. MACON, *Primary Examiner.*

ROBERT K. SCHAEFER, *Examiner.*

M. GINSBURG, *Assistant Examiner.*